United States Patent [19]

Imazu

[11] Patent Number: 4,888,780
[45] Date of Patent: Dec. 19, 1989

[54] METHOD OF DETECTING AND CORRECTING AN ERROR THAT HAS OCCURRED IN A DIGITAL COMPUTER

[75] Inventor: Ryuzo Imazu, Suita, Japan

[73] Assignee: Fuji Sangyo Co., Ltd., Osaka, Japan

[21] Appl. No.: 131,063

[22] Filed: Dec. 10, 1987

[30] Foreign Application Priority Data

Jan. 7, 1987 [JP] Japan .................................... 62-1492

[51] Int. Cl.$^4$ .............................................. G06F 11/10
[52] U.S. Cl. ........................................ 371/31; 371/52; 371/57.2
[58] Field of Search .............................. 371/52, 57, 31

[56] References Cited

U.S. PATENT DOCUMENTS

| | | | |
|---|---|---|---|
| 2,975,404 | 3/1961 | Kups | 371/57 |
| 3,245,033 | 4/1966 | Plouffe et al. | 371/67 |
| 3,274,379 | 9/1966 | Hinrichs | 371/67 |
| 3,350,685 | 10/1967 | Lindaman | 371/67 |
| 3,652,987 | 3/1972 | McCarthy, Jr. | 371/57 |
| 3,886,522 | 5/1975 | Barton et al. | 371/57 |
| 4,032,885 | 6/1977 | Roth | 371/67 |
| 4,177,447 | 12/1979 | Jaouen | 371/57 |

Primary Examiner—Charles E. Atkinson
Attorney, Agent, or Firm—Jordan and Hamburg

[57] ABSTRACT

A method for detecting and correcting an error that has occurred in a digital computer, comprises the steps of: counting the number of mark bits in each predetermined area of each of component units constituting data, each of the component units being expected to be represented by one of reference representations; detecting the occurrence of an error in the area when the count value is not identical with any of preset reference values in the corresponding areas; and correcting the component unit of the data in which the error has been detected, by a reference representation having a reference value in the corresponding area which is the closest to the count value.

2 Claims, 7 Drawing Sheets

FIG. 9 ized internally by binary numbers. For example,
METHOD OF DETECTING AND CORRECTING AN ERROR THAT HAS OCCURRED IN A DIGITAL COMPUTER

BACKGROUND OF THE INVENTION

1. Field of the Art

The present invention relates to a method for detecting and correcting an error that has occcurred in a digital computer.

2. Prior Art

In a conventional digital computer, there are instances in which the contents of data are erroneously changed during data transmission or data processing, mainly due to hardware errors such as noise.

In a digital computer, numerical data are generally represented internally by binary numbers. For example, a numeral "9" in a decimal notation is internally represented by "1001" in a binary notation. Accordingly, a change in one bit of the most significant bit of the data due to noise or the like, causes the data to be internally represented as "0001". This presents a disadvantage that the representation "0001" is treated as "1" in the decimal notation. Further, it is not possible to correct the numerical data in which such error has taken place, to the original numeral "9" in the decimal notation.

As to character data, if a 2-bit error takes place in, for example, an ASCII code with a parity bit, such error cannot be detected and corrected.

OBJECTS OF THE INVENTION

It is an object of the present invention to provide a method for detecting and correcting an error that has occurred in a digital computer, by which method detecting and correcting the above-mentioned error are easily achieved.

SUMMARY OF THE INVENTION

In order to achieve this object, the present invention provides an error detecting and correcting method which comprises the steps of:

counting the number of mark bits in each predetermined area each of component unit constituting data, each of the component units being capable of being represented by one of a predetermined number of reference representations that correspond to valid states of the component unit:

detecting the occurrence of an error in the predetermined area if the number of mark bits thus counted is not identical with any reference number of mark bits in the corresponding areas of any of the reference inner representations; and correcting the component unit including the error thus detected, by one of the reference inner representations having a reference number of mark bits in the corresponding area which is the closest to the number of mark bits in the area of which the error has been detected.

It is appreciated that the present invention also includes a method in which "space bits" are used instead of "mark bits". The term "expected", as herein employed, refers to a representation that corresponds to a character or condition that the component unit under test could have, if it were in error, i.e., to valid states of the component unit.

Data such as numerical data, character data and the like include one or more component units. Each component unit is expected to be expressed by one representation, which is selected out of a predetermined number of reference representations. Each component unit includes a plurality of areas. The count numbers of mark bits in the respective areas are previously set as the reference numbers for each reference representation.

The following paragraphs will discuss the method in accordance with the invention for comparing data with the reference representations to detect and correct an error that has occurred during transmission, processing and the like of such data.

First, the number of mark bits in one area of one component unit of the data is counted. The mark bit number thus counted is compared with a reference number of mark bits in a corresponding area of each reference representation. When the mark bit number is not identical with the reference number, it is determined that an error has occurred in this area of the data. When the error is detected, the component unit of the data including such error is corrected by one of the reference representations having a reference number of mark bits in the corresponding area which is the closest to the mark bit number in the area of which the error has been detected. The error detecting and correcting operations above-mentioned are carried out for every area of every component unit, whereby error detection and correction can be carried out for the entire data.

As discussed hereinbefore, the present invention provides a method for detecting and correcting an error that has occurred in a digital computer, which is capable of easily detecting and correcting even error of change in the contents of a plurality of bits of data.

In accordance with the present invention, processing based on space bits can also be executed instead of processing based on mark bits.

DETAILED DESCRIPTION OF THE PREFERRED EMBODIMENTS

The following description will discuss embodiments of the present invention with reference to the attached drawings.

Figure 1:
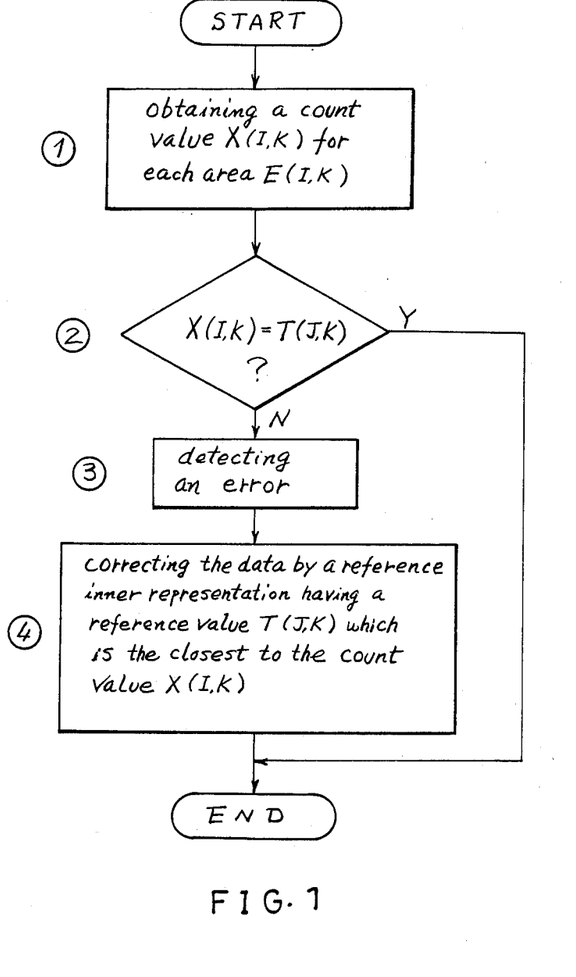
FIG. 1 is a flowchart showing an embodiment of the present invention.

FIG. 1 is a flowchart showing an embodiment of the present invention.

In this embodiment, data are constituted by A component unit U(I) (I=1 to A). A representation D(I) (I=1 to A) of each component unit U(I) constitutes data in which an error is to be detected and corrected, and is selected out of B reference representations R(J) (J=1 to B). M areas E(I, K) (I=1 to A, K=1 to M) are set in each component unit U(I). Correspondingly, M areas S(J, K) (J=1 to B, K=1 to M) are set in each reference representation R(J). For the reference representations R(J), mark bit count values T(J, K) (J=1 to B, K=1 to M) of the areas S(J, K) are previously set as reference values.

The following description will discuss the respective steps of the flowchart in succession.

At step 1 the number of mark bits of an area E(I, K) of a component unit U(I) of data of which an error is to be detected and corrected is counted, whereby a count value X(I, K) is obtained. At the step 2, whether or not this count value X(I, K) is identical with any of reference values T(J, K) of the areas concerned is determined. When there is a reference value identical with the count value X(I, K), no error is considered to have taken place, and the processing is finished. On the contrary, if there is no reference value identical with the count value X(I, K), an error in an area E(I, K) of the component unit U(I) is detected at the step 3. At step 4 is a reference representation R(J) having a reference value T(J, K) which is the closest to the count value X(I, K) is searched. The component unit U(I) of the data including such error is rewritten by this reference representation R(J) to correct the error. The processing is then finished.

The following description will discuss an example of the steps 2 to 4 of the flowchart with the use of an example of the reference representations R(J) (J=1 to B).

Figure 2:
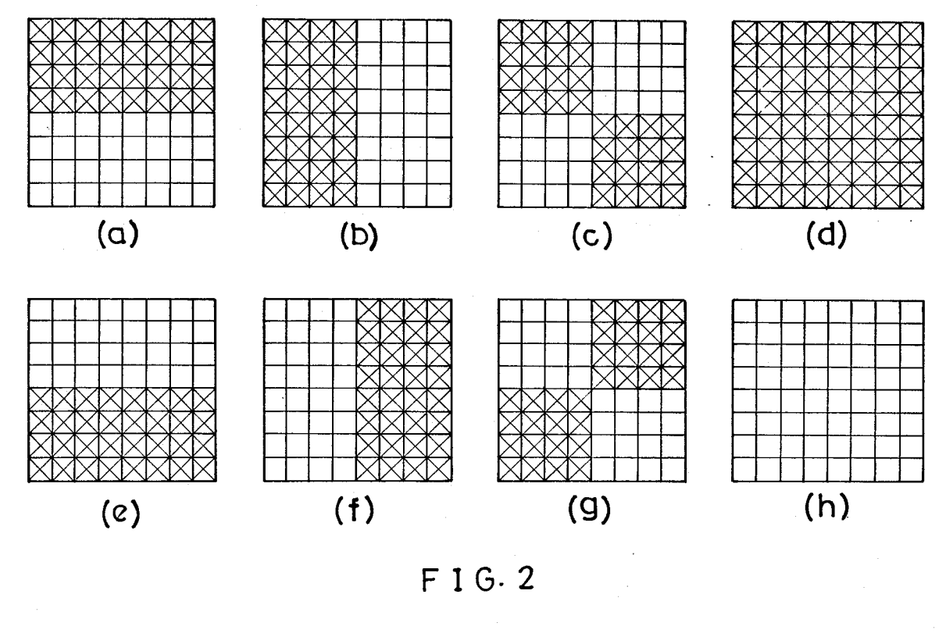
FIGS. 2a-2h show an illustrative set of reference representations.

FIG. 2 shows an illustrative set of reference representations with B being equal to 8.

Each of the reference representations R(J) (J=1 to 8) is constituted by 8×8 bits, or 64 bits, and a mark bit is represented by "x". In FIG. 2, an 8-box row represents 1 byte, and the length of each reference representation is equal to 8 bytes.

Each reference representation R(J) has four portions. A portion I has 16 bits, i.e., the upper 4 bits of the former-half 4 bytes, while a portion II has 16 bits, i.e, the lower 4 bits of the former-half 4 bytes. Each of a portion III and a portion IV has 16 bits, i.e., the upper or lower 4 bits of the latter-half 4 bytes.

The reference representation R(1) shown in FIG. 2(a) has the portions I and II in which all bits are mark bits, and the portions III and IV in which all bits are space bits.

The reference representation R(2) shown in FIG. 2(b) has the portions I and III in which all bits are mark bits, and the portions II and IV in which all bits are space bits.

The reference representation R(3) shown in FIG. 2(c) has the portions I and IV in which all bits are mark bits, and the portions II and III in which all bits are space bits.

The reference representation R(4) shown in FIG. 2(d) has the portions I, II, III and IV in which all bits are mark bits.

As shown in FIG. 2(e) to (h), reference representations R(5) to R(8) are those in which the mark bits and the space bits in the reference representations R(1) to R(4) are inverted with respect to those of FIGS. 2(a)–2(d).

The number of areas is equal to 4. For J which is from 1 to 8, an area S(J, 1) includes the portions I and IV, an area S(J, 2) includes the portions I and II, an area S(J, 3) includes the portions I, II and III, and an area S(J, 4) includes the portions I, II, III and IV.

When the reference representations R(J) (J=1 to 8) and the areas S(J, K) (J=1 to 8, K=1 to 4) are determined as above-mentioned, the reference values T(J, K) (J=1 to 8, K=1 to 4) are determined as shown in Table 1. Data will be judged according to the flowchart in FIG. 3, to detect and correct an error.

Figure 3:
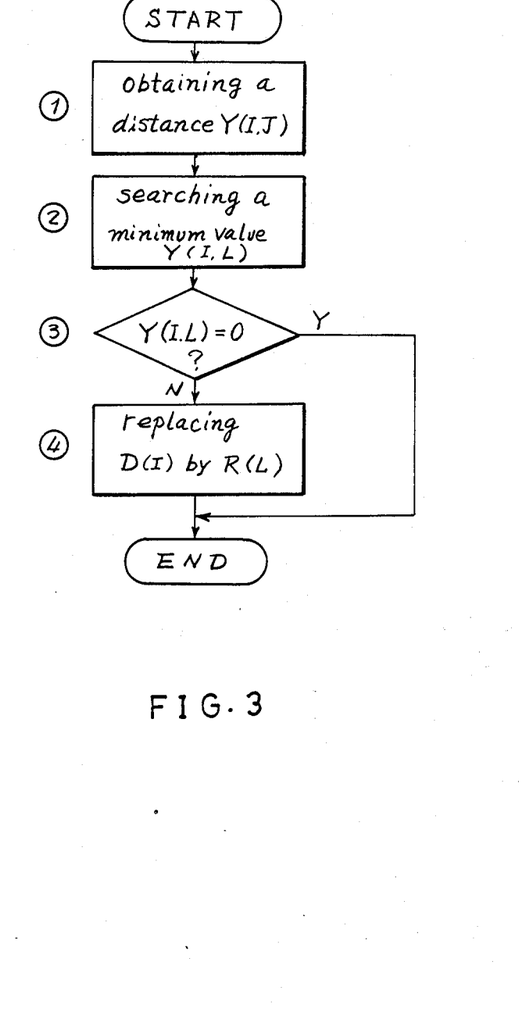
FIG. 3 is a flowchart applied to the reference representations in FIG. 2, showing an example of the steps 2 to 4 in the flowchart in FIG. 1.

More specifically, by counting the number of mark bits in an area E(I, K) of a component unit U(I), a count value X(I, K) (K=1 to 4) is obtained, after which, at the step 1, a distance Y(I, J) (J=1 to 8) between a representation D(I) and each reference representation R(J) is calculated according to the following equation (1):

$$Y(I, J) = (X(I, 1) - T(J, 1))2 + (X(I, 2) - T(J, 2))2 + (X(I, 3) - T(J, 3))2 + (X(I, 4) - T(J, 4))2 \quad (1)$$

$$(J = 1 \text{ to } 8)$$

It is here noted that "** 2" is a mark representing an operation of raising to the second power, and the distance Y(I, J) is a square sum of a difference between a reference value and a count value obtained for each area.

At the step 2 is a minimum value Y(I, L) out of values Y(I, 1) to Y(I, 8) calculated at the step 1 is determined. At the step 3, it is judged whether or not this minimum value Y (I, L) is equal to 0. When the minimum value Y is equal to 0, it means that no error has taken place. Thus, the representation D(I) is not corrected and the processing is finished. If the minimum value Y(I, L) is not equal to 0, it is judged that an error has taken place in the representation D(I) of the component unit U(I) and that a reference representation R(L) is closest to the representation D(I). At the step 4, the representation D(I) is corrected to the reference representation R(L).

Figure 4:
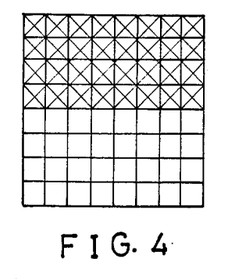
FIG. 4 is a view showing the representation of a component unit of data including no error, to which the flowchart in FIG. 3 is applied.

According to the above flowchart, the count values X(I, 1), X(I, 2), X(I, 3) and X(I, 4) of, for example, a representation D(I) shown in FIG. 4, are 16, 32, 32 and 32, respectively. Out of the distance values Y(I, 1) to Y(I, 8), the Y(I, 1) is the minimum distance value which is equal to 0. Accordingly, it is judged that no error has taken place.

Figure 5:
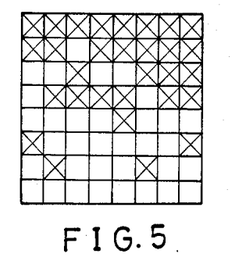
FIG. 5 is a view showing the representation of a component unit of data in which an error has taken place, to which the flowchart in FIG. 3 is applied.

On the other hand, it is now supposed for example that, out of 64 bits of the representation D(I) shown in FIG. 4, 12 bits are inverted to produce an error, so that the representation D(I) becomes as shown in FIG. 5. In such case, the count values X(I, 1), X(I, 2), X(I, 3) and X(I, 4) are 14, 25, 27 and 30, and the distance values Y(I, 1) to Y(I, 8) are 82, 114, 530, 1970, 754, 210, 306 and 2450, respectively. Of these, the minimum distance value is Y(I, 1) which is not equal to 0. Accordingly, an error is detected and this representation D(I) is corrected to the reference inner representation R(1).

Figure 6:
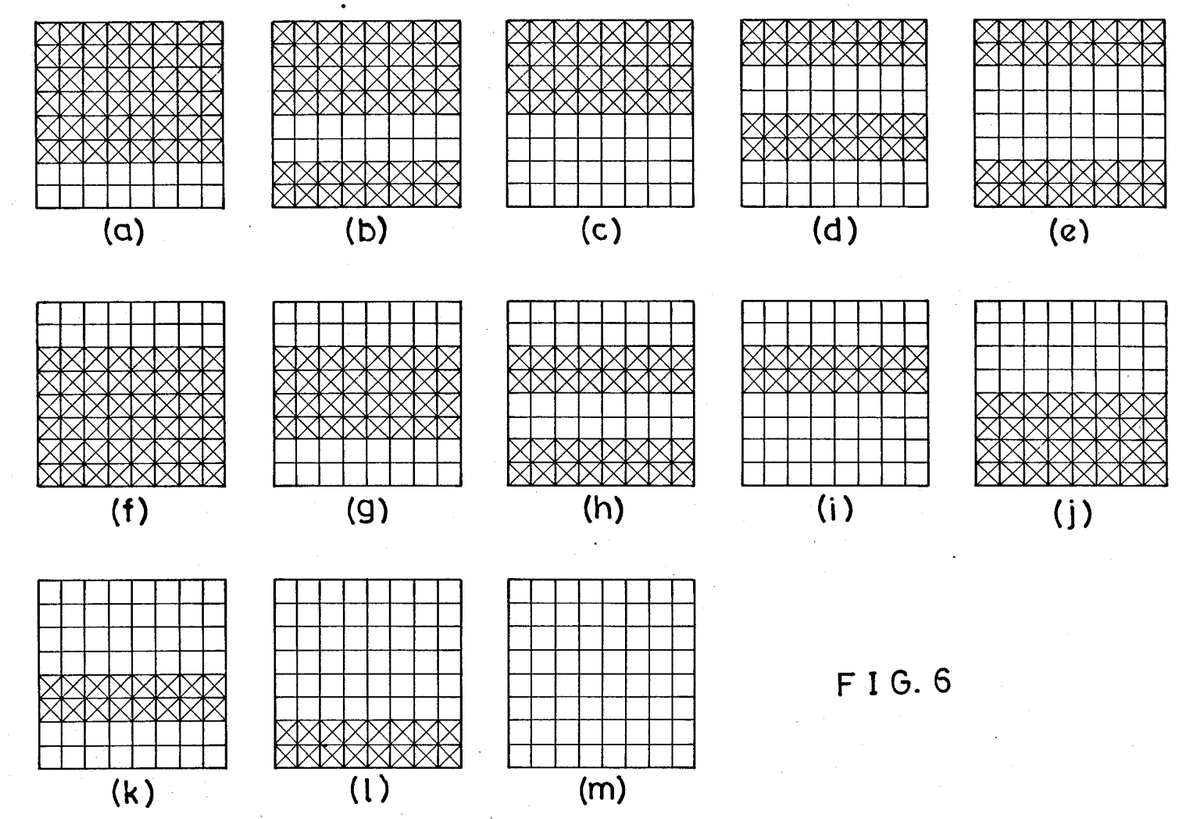
FIGS. 6a-6m show another illustrative set of reference representations.

The following description will discuss another example of the steps 2 to 4 of the flowchart shown in FIG. 1 with the use of another example of the reference representations R(J) (J=1 to B). FIG. 6 shows an illustrative set of reference representations with B being equal to 13.

Each of the reference representations R(J) (J=1 to 13) has 8×8 bits or 64 bits, and a mark bit is represented by "x". As in the previous example, an 8-box row represents one byte, and the length of one reference representation is 8 bytes.

The number of areas M is equal to 4. For J which is from 1 to 13, an area (S, J, 1) has 16 bits of the first and second bytes. Areas S(J, 2), S(J, 3) and S(J, 4) include the third and fourth bytes, the fifth and sixth bytes, and the seventh and eighth bytes, respectively.

The reference representations R(1) to R(13) shown in FIG. 6(a) to (m) are those for numerical data and respectively represent "0", "1", "2", "3", "4", "5", "6", "7", "8", "9", "+", "−" and ".".

When the reference representations R(J) J=1 to 13) and the areas S(J, K) (J=1 to 13, K=1 to 4) are determined as above-mentioned, the reference values T(J, K) (J=1 to 13, K=1 to 4) are determined as shown in Table 2. According to a flowchart shown in FIG. 7, data are to be judged to detect and correct an error.

Figure 7:
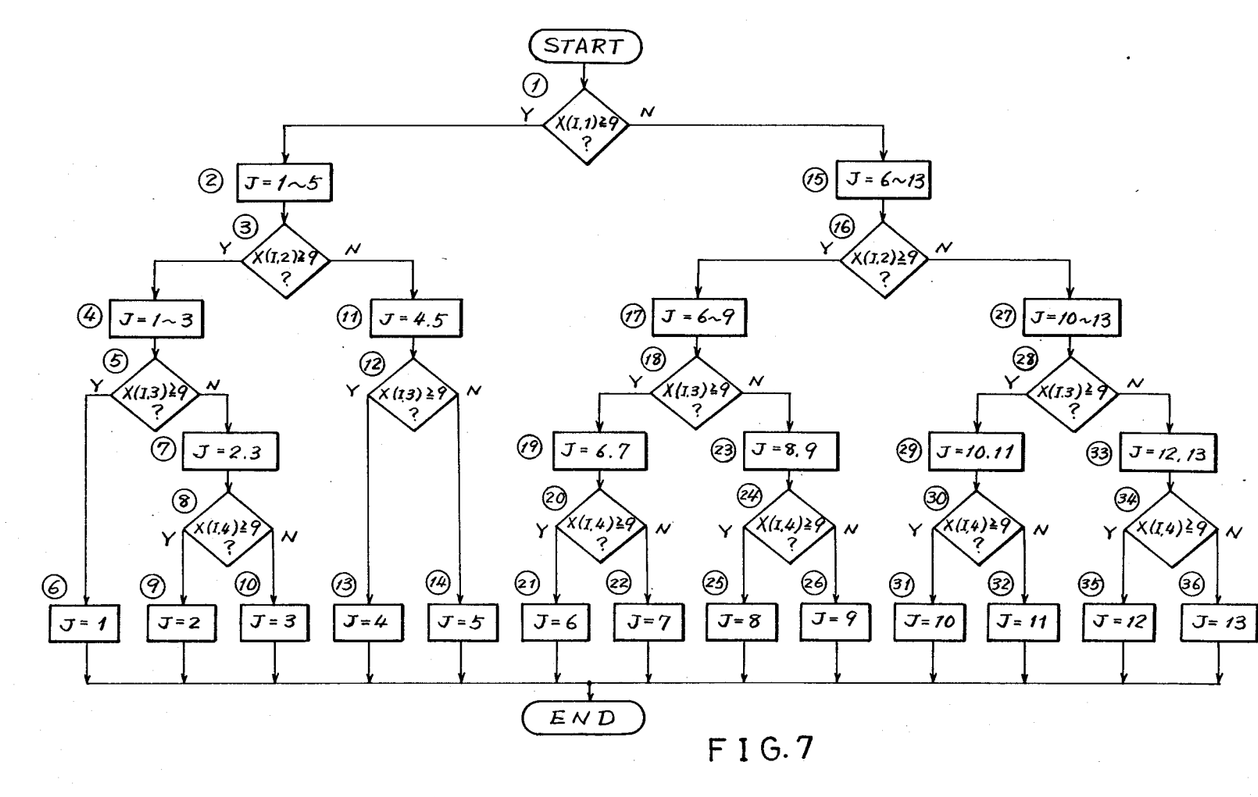
FIG. 7 is a flowchart applied to the reference representations in FIG. 6, showing another example of the steps 2 to 4 in the flowchart in FIG. 1.

In such case, every reference value T (J, K) (J=1 to 13, K=1 to 4) of any area of any reference representation is equal to 0 or 16, and does not become a numeral other than 0 and 16. Therefore, count values X(I, K) obtained by counting the numbers of mark bits in the areas E(I, K) can be divided into two groups, i.e., one equal to or greater than 9 and the other equal to or smaller than 8.

Accordingly, when it is judged that a count value X(I, K) is not equal to 0 or 16 with an error taken place, the error is detected and corrected by a reference representation having a reference valueclosest to the count value above-mentioned.

Figure 8:
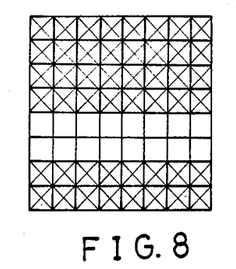
FIG. 8 is a view showing the representation of a component unit of data including no error, to which the flowchart in FIG. 7 is applied.

For example, for a representation D(I) shown in FIG. 8, the count values X(I, 1), X(I, 2), X(I, 3) and X(I, 4) are 16, 16, 0 and 16, respectively. Through the processings at the steps 1, 2, 3, 4, 5, 7, 8 and 9, this representation is judged to be numerical data "2" represented by a reference representation R(2).

Figure 9:
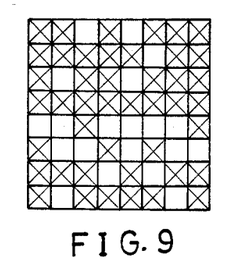
FIG. 9 is a view showing the representation of a component unit in which an error has taken place, to which the flowchart in FIG. 7 is applied.

It is now supposed for example that an error has taken place in which 14 bits out of 64 bits of the representation D(I) in FIG. 8 have been inverted as shown by a representation D(I) in FIG. 9. In such case, the count values X(I, 1), X(I, 2), X(I, 3) and X(I, 4) are 13, 14, 5 and 12, respectively, which areneither 0 nor 16. Thus, an error is detected. In this case too, the processing proceeds with the same steps as those for the representation shown in FIG. 8, and the error is corrected to numerical data "2" represented by the reference representation R(2). In this case, it is possible to detect and correct the error by merely checking a relationship in size between the count value X(I, K) and the reference representations at most three or four times.

When using one of the representations abovementioned for each component unit, each of these representations represents one digit of a decimal number. For example, numerical data "+12" are represented by a successive combination of the reference representations which are shown in FIGS. 6(k), (b) and (c) in this order, and have total 192 bits. These numerical data as expressed by the representations can be operated when the operation rule is determined in the same manner as for the operation of the decimal notation.

More specifically, the method in accordance with the present invention can be applied not only for detection and correction of an error that has occurred at the time of data transmission between a main memory device and an auxiliary one or between digital computers, but also for detection and correction of an error that has occurred in the operation in the CPU. That is, the method of the present invention can be made in firmware and incorporated in the CPU, so that an error can be detected and corrected each time the CPU fetches data for data transmission or a data operation.

The use of the above-mentioned representations having a sufficient redundancy requires a large-capacity memory and a high-speed CPU. Such requirements can be met with a recent tendency of costs of memories to decrease and the advancement of high-speed CPU technology.

TABLE 1

| J | K=1 | K=2 | K=3 | K=4 |
|---|---|---|---|---|
| 1 | 16 | 32 | 32 | 32 |
| 2 | 16 | 16 | 32 | 32 |
| 3 | 32 | 16 | 16 | 32 |
| 4 | 32 | 32 | 48 | 64 |
| 5 | 16 | 0 | 16 | 32 |
| 6 | 16 | 16 | 16 | 32 |
| 7 | 0 | 16 | 32 | 32 |
| 8 | 0 | 0 | 0 | 0 |

TABLE 2

| J | K=1 | K=2 | K=3 | K=4 |
|---|---|---|---|---|
| 1 | 16 | 16 | 16 | 0 |
| 2 | 16 | 16 | 0 | 16 |
| 3 | 16 | 16 | 0 | 0 |
| 4 | 16 | 0 | 16 | 0 |
| 5 | 16 | 0 | 0 | 16 |
| 6 | 0 | 16 | 16 | 16 |
| 7 | 0 | 16 | 16 | 0 |
| 8 | 0 | 16 | 0 | 16 |
| 9 | 0 | 16 | 0 | 0 |
| 10 | 0 | 0 | 16 | 16 |
| 11 | 0 | 0 | 16 | 0 |
| 12 | 0 | 0 | 0 | 16 |
| 13 | 0 | 0 | 0 | 0 |

What is claimed is:

1. A method for detecting and correcting an error that has occurred in a digital computer comprising the steps of:

counting the number of mark bits in each predetermined area of each of the component units constituting data, each of said component units being capable of being represented by one of a predetermined number of reference representations that correspond to valid states of the component unit;

detecting the occurrence of an error in said area when said number of mark bits is not identical to the number of mark bits in the corresponding areas of any of said reference representations; and correcting said component units in which the error has been detected by substituting therefor that one of said reference representations that has the number of mark bits in the corresponding area which is the closest to the number of mark bits in said area in which the error has been detected.

2. A method for detecting and correcting an error that has occurred in a component unit of data, comprising;
- providing a plurality of representations that correspond to valid states of said component unit of data;
- counting the number of mark or space bits in each predetermined area of said component unit;
- detecting the occurrence of an error in said area when said number of mark or space bits is not identical with the number of mark or space bits in the corresponding areas of any of said reference representations; and
- when an error has been detected, substituting for the component unit, that one of said representations that has the number of mark or space bits in the corresponding area which is the closest to the number of mark or space bits in said area in which the error has been detected.

* * * * *